United States Patent
Ouchi

(10) Patent No.: US 9,714,013 B2
(45) Date of Patent: Jul. 25, 2017

(54) COLLISION AVOIDANCE ASSIST APPARATUS

(75) Inventor: Yusuke Ouchi, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/389,530

(22) PCT Filed: Apr. 2, 2012

(86) PCT No.: PCT/JP2012/058990
§ 371 (c)(1),
(2), (4) Date: Oct. 30, 2014

(87) PCT Pub. No.: WO2013/150600
PCT Pub. Date: Oct. 10, 2013

(65) Prior Publication Data
US 2015/0066323 A1    Mar. 5, 2015

(51) Int. Cl.
*B60T 7/22*    (2006.01)

(52) U.S. Cl.
CPC ............ *B60T 7/22* (2013.01); *B60T 2201/022* (2013.01)

(58) Field of Classification Search
CPC .... B60T 7/22; B60T 2201/022; B60W 30/09; G01S 13/931; G01S 2013/9353; G08G 1/16
USPC .................................................. 701/70, 301
See application file for complete search history.

(56) References Cited

U.S. PATENT DOCUMENTS

| | | | | |
|---|---|---|---|---|
| 5,983,161 A * | 11/1999 | Lemelson | ............... | G01S 19/11 340/436 |
| 6,044,321 A * | 3/2000 | Nakamura | ......... | B60K 31/0008 180/179 |
| 6,624,747 B1 * | 9/2003 | Friederich | .......... | B60K 31/0008 180/271 |
| 6,894,605 B2 * | 5/2005 | Isogai | ................ | B60K 31/0008 340/435 |
| 7,124,027 B1 * | 10/2006 | Ernst, Jr. | ................ | B60W 30/09 340/435 |
| 7,425,043 B2 * | 9/2008 | Doerr | ....................... | B60Q 1/44 303/193 |
| 8,386,146 B2 * | 2/2013 | Shirai | ................ | B60K 31/0008 180/170 |
| 2002/0091479 A1 * | 7/2002 | Maruko | .................... | B60T 7/22 701/96 |

(Continued)

FOREIGN PATENT DOCUMENTS

| | | |
|---|---|---|
| EP | 1418104 A2 | 10/2003 |
| EP | 1559607 A1 | 8/2005 |

(Continued)

*Primary Examiner* — Atul Trivedi
(74) *Attorney, Agent, or Firm* — Andrews Kurth Kenyon LLP

(57) ABSTRACT

There is provided a collision avoidance assist apparatus that includes an object detection sensor that detects a relative speed between a vehicle and an object ahead, a brake unit that brakes the vehicle so as to avoid collision with the object ahead, and a control unit that sets a set braking time that will be taken for the relative speed to reach zero based on set deceleration determined depending on a braking ability of the vehicle, and controls the brake unit such that the braking of the vehicle is continued over the set braking time.

4 Claims, 4 Drawing Sheets

(56) References Cited

U.S. PATENT DOCUMENTS

| | | | |
|---|---|---|---|
| 2004/0085197 A1* | 5/2004 | Watanabe | B60T 7/22 340/435 |
| 2004/0140143 A1* | 7/2004 | Saeki | B60K 31/0008 180/271 |
| 2004/0193374 A1* | 9/2004 | Hac | B60K 31/0008 701/301 |
| 2004/0199327 A1 | 10/2004 | Isogai et al. | |
| 2005/0107954 A1* | 5/2005 | Nahla | B61L 25/021 701/301 |
| 2006/0097570 A1* | 5/2006 | Doerr | B60Q 1/44 303/193 |
| 2006/0155469 A1* | 7/2006 | Kawasaki | B60R 21/013 701/301 |
| 2007/0192030 A1* | 8/2007 | Tanimichi | B60W 10/18 701/301 |
| 2007/0198136 A1* | 8/2007 | Kobayashi | B60K 26/021 701/1 |
| 2008/0306691 A1* | 12/2008 | Louis | G08G 5/06 701/301 |
| 2008/0312834 A1* | 12/2008 | Noda | B60T 7/22 701/301 |
| 2009/0102277 A1 | 4/2009 | Ezoe et al. | |
| 2009/0143951 A1* | 6/2009 | Takahashi | B60W 30/02 701/70 |
| 2009/0150034 A1* | 6/2009 | Ezoe | B60T 7/12 701/53 |
| 2009/0192710 A1* | 7/2009 | Eidehall | B62D 15/0265 701/301 |
| 2010/0023226 A1 | 1/2010 | Ito | |
| 2010/0280726 A1* | 11/2010 | Stabrey | B60T 7/22 701/70 |
| 2013/0110368 A1* | 5/2013 | Zagorski | B60T 7/22 701/70 |
| 2015/0012204 A1* | 1/2015 | Breuer | B60T 7/22 701/96 |

FOREIGN PATENT DOCUMENTS

| | | |
|---|---|---|
| EP | 2060464 A2 | 11/2007 |
| JP | 2004-259151 A | 9/2004 |
| JP | 2005-001460 A | 1/2005 |
| JP | 2009-154770 A | 7/2009 |
| JP | 2009-214764 | 9/2009 |
| JP | 2009-262700 A | 11/2009 |

* cited by examiner

COLLISION AVOIDANCE ASSIST APPARATUS

CROSS-REFERENCE TO RELATED APPLICATIONS

This is a national phase application based on the PCT International Patent Application No. PCT/JP2012/058990 filed Apr. 2, 2012, the entire contents of which are incorporated herein by reference.

TECHNICAL FIELD

The present invention relates to a collision avoidance assist apparatus.

BACKGROUND ART

In the related art, as disclosed in Japanese Unexamined Patent Application Publication No. 2005-1460, an apparatus is known, which assists the collision avoidance of a vehicle with an object ahead such as a preceding vehicle by braking the vehicle. In such an assist apparatus, an appropriate braking is required to be performed at the time of assisting the collision avoidance.

CITATION LIST

Patent Literature

[Patent Literature 1] Japanese Unexamined Patent Application Publication No. 2005-1460

SUMMARY OF INVENTION

Technical Problem

For example, in the assist apparatus described above, assuming a braking by a maximum output power, a maximum contact prediction time that will be taken for a vehicle to contact an object ahead is obtained, and the collision avoidance assist by braking is released after the maximum contact prediction time elapses. In this case, since the release is determined based on the time to contact, there is a possibility that an excessive braking may be performed.

In addition, in another apparatus, based on a relative speed between the vehicle and the object ahead, when the relative speed is equal to or higher than zero and a distance between the vehicle and the object ahead begins to widen, the collision avoidance assist by the braking is released. In this case, since the release is determined by only the relative speed as a condition, there is a possibility that an insufficient braking be performed.

The present invention has an object to provide a collision avoidance assist apparatus that enables an appropriate braking to be performed.

Solution to Problem

A collision avoidance assist apparatus according to the present invention includes a detection section that detects a relative speed between a vehicle and an object ahead; a brake section that brakes the vehicle so as to avoid the collision with the object ahead; and a control section that sets a braking time that will be taken for the relative speed to reach zero based on deceleration determined depending on a braking ability of the vehicle, and controls the brake section such that the braking of the vehicle is continued over the braking time.

According to such a collision avoidance assist apparatus, the braking is continued over the braking time (set braking time) that will be taken for the relative speed to reach zero based on the deceleration (set deceleration) determined depending on a braking ability of the vehicle. Here, the set braking time is set as the shortest time that will be taken for the relative speed between the vehicle and the object ahead to reach zero by the braking at the deceleration that the vehicle can produce, that is, the shortest time for avoiding the collision of the vehicle with the object ahead. Particularly, it is preferable that the set braking time be set as the shortest braking time that will be taken for the relative speed to reach zero based on the maximum deceleration that the vehicle can produce. In this way, since the braking is continued at least over the set breaking time, a sufficient braking can be performed.

In addition, in a case where the braking is continued over the breaking time, and the relative speed reaches zero or a speed of the vehicle reaches zero, the control section may control the brake section so as to stop the braking. In this way, until the relative speed reaches zero or the speed of the vehicle reaches zero, since the braking is continued at least over the set breaking time, the braking that is neither excessive nor insufficient can be performed.

The control section may set the set braking time based on the relative speed detected at the time of starting the braking. In this way, compared to the case where the set braking time is set based on the relative speed detected while the braking is performed, the relative speed can be accurately detected and the set braking time can be appropriately set.

Advantageous Effects of Invention

According to the present invention, a collision avoidance assist apparatus that enables an appropriate braking to be performed can be provided.

DESCRIPTION OF EMBODIMENTS

Hereinafter, referring to drawings accompanied hereto, a configuration of a collision avoidance assist apparatus according to an embodiment in the present invention will be described in detail. Here, the same elements are referred to by the same numerals in describing the drawings, and the description will not be duplicated.

Figure 1:
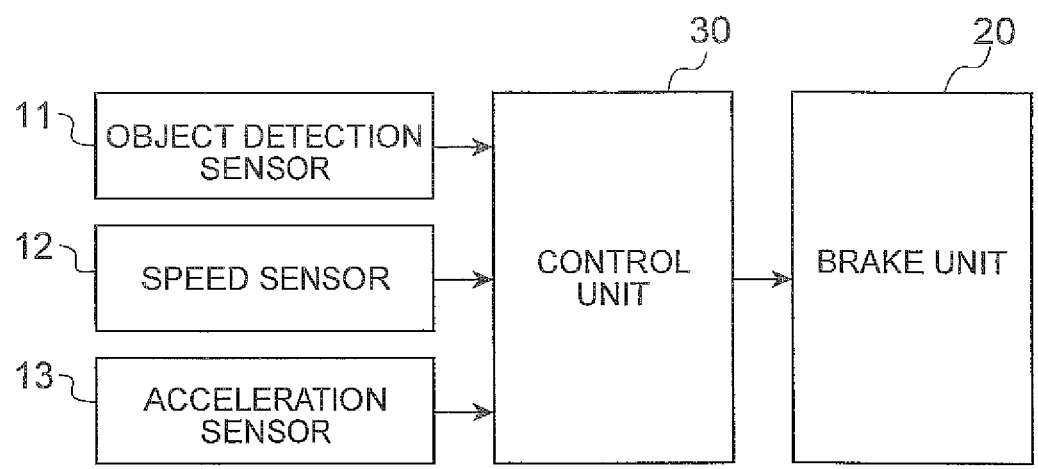
FIG. 1 is a block diagram illustrating a configuration of a collision avoidance assist apparatus according to an embodiment in the present invention.

First, referring to FIG. 1, a configuration of the collision avoidance assist apparatus according to the embodiment of the present invention will be described. FIG. 1 is a block diagram illustrating a configuration of the collision avoidance assist apparatus according to the embodiment in the present invention.

The collision avoidance assist apparatus is mounted on a vehicle, and controls a braking of the vehicle in order to avoid a collision with an object ahead which is detected in front of the vehicle.

Hereinafter, the description will be made with regard to the case of avoiding the collision with an object ahead such as a preceding vehicle. However, the same description can be applied to a case of decreasing damage to the vehicle due to the collision with the object ahead.

As illustrated in FIG. 1, the collision avoidance assist apparatus mounted on the vehicle includes an object detection sensor 11, a speed sensor 12, an acceleration sensor 13, a brake unit 20, and a control unit 30. The object detection sensor 11, the speed sensor 12, and the acceleration sensor 13 are respectively connected to the control unit 30, and the control unit 30 is connected to the brake unit 20.

The object detection sensor 11 functions as a detection section that detects a relative speed Vr between the vehicle and the object ahead. As the object detection sensor 11, a radar sensor, a camera sensor, or the like is used. The object detection sensor 11 detects a distance from the vehicle to the object ahead as well as the relative speed Vr. The object detection sensor 11 supplies the detected values to the control unit 30.

The speed sensor 12 detects a speed V0 of the vehicle. As the speed sensor 12, a wheel speed sensor or the like is used. The acceleration sensor 13 detects acceleration a or deceleration d of the vehicle. As the acceleration sensor 13, a semiconductor gauge type sensor, an electrostatic capacitance type sensor, or the like is used. The speed sensor 12 and the acceleration sensor 13 supply the respective detection values to the control unit 30.

The brake unit 20 and the control unit 30 are electronic control units (ECU) that are mounted on the vehicle. Each ECU includes a CPU, ROM, RAM, and the like, and the CPU functions as the brake unit 20 or the control unit 30 by reading a program from the ROM or the like and executes the program on the RAM.

The brake unit 20 functions as a brake section that brakes the vehicle so as to avoid the collision with the object ahead. The brake unit 20 brakes the traveling vehicle by causing a main brake such as a wheel brake or the like to operate based on a control signal from the control unit 30. The brake unit 20, for example, may cause an auxiliary brake such as an engine brake, an engine retarder, or the like to operate. In FIG. 1, a case of braking the vehicle by one unit is illustrated; however, two or more units may be used for braking.

The control unit 30 functions as a control section that controls the braking of the vehicle by the brake unit 20. The control unit 30 sets a braking time (hereafter, referred to as a set braking time tbd) which is the time that will be taken for the relative speed Vr between the vehicle and the object ahead to reach substantially zero based on the deceleration (hereafter, referred to as set deceleration dd) which is determined depending on a braking ability of the vehicle. Then, the control unit 30 controls the brake unit 20 such that the braking is continued over the set braking time tbd, that is, so as not to release the collision avoidance assist until the set braking time tbd elapses.

Here, the set deceleration dd is set as the deceleration d determined depending on the braking ability of the vehicle, that is, the maximum deceleration d that the vehicle can produce, or an approximate value thereof. The set deceleration dd may be set as a predetermined value based on the characteristics of the vehicle, or may be set as a variable value considering braking conditions such as a state of the traveling road, a cargo weight, or the like.

The set braking time tbd is set as the time that will be taken for the relative speed Vr between the vehicle and the object ahead to reach substantially zero by the braking at the set deceleration dd that the vehicle can produce, or an approximate value thereof. That is, the set braking time tbd is set as a shortest time required for the vehicle to avoid the collision with the object ahead, or an approximate value thereof. The set braking time tbd, for example, is set by dividing the relative speed Vr by the set deceleration dd (tbd=Vr/dd). Since the actual deceleration d changes according to the braking conditions, the set braking time tbd is set as the shortest time required only for avoiding the collision.

Figure 2:
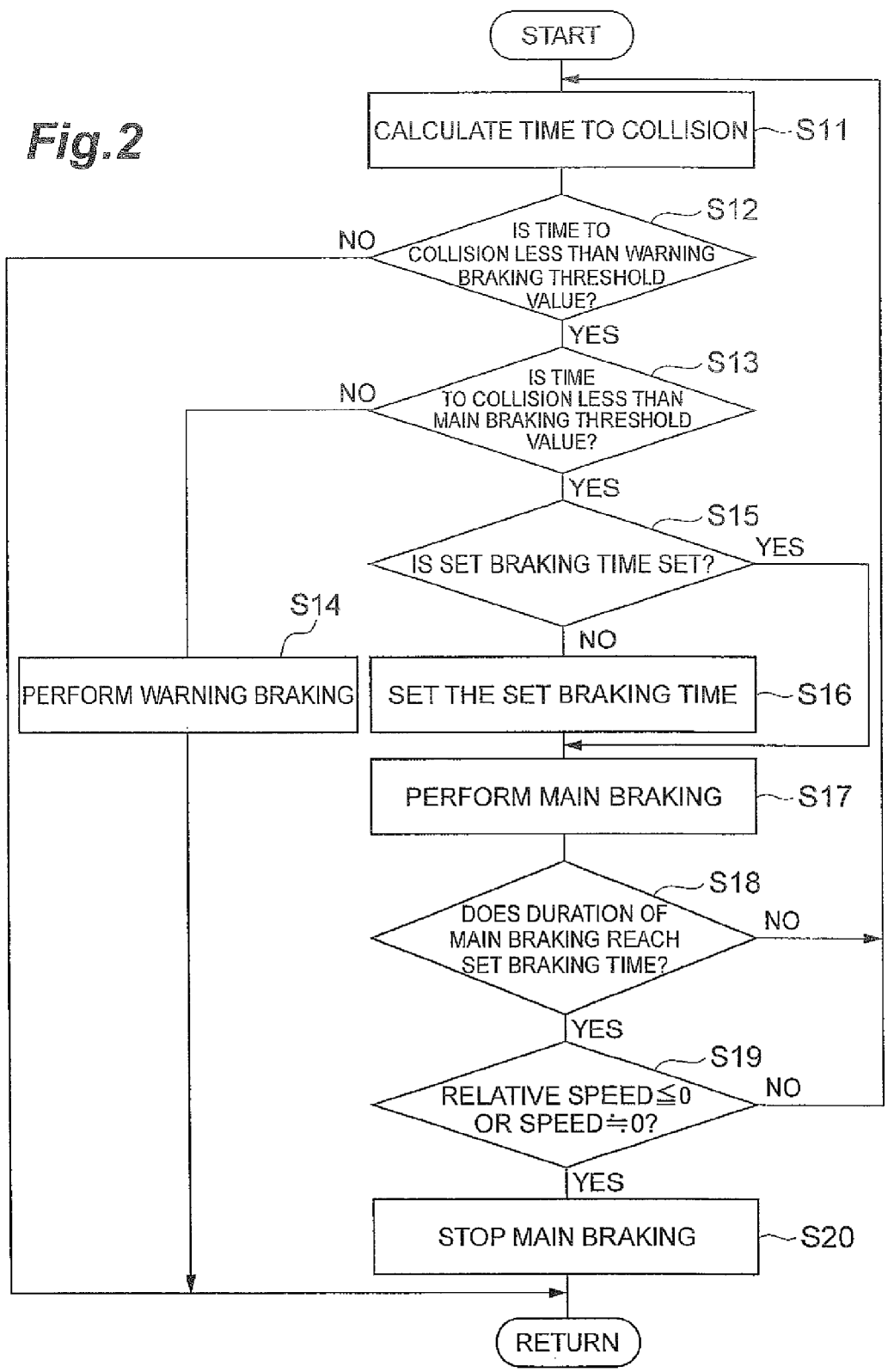
FIG. 2 is a flow chart illustrating an operation of the collision avoidance assist apparatus.

Next, with reference to FIG. 2, an operation of the collision avoidance assist apparatus will be described. FIG. 2 is a flow chart illustrating an operation of the collision avoidance assist apparatus. The collision avoidance assist apparatus repeatedly performs the processing illustrated in FIG. 2 in a predetermined period during the traveling of the vehicle.

As illustrated in FIG. 2, the control unit 30 calculates a time to collision (TTC) of the vehicle with the object ahead (STEP S11). The time to collision is calculated based on the distance from the vehicle to the object ahead and the relative speed Vr between the object ahead and the vehicle. Furthermore, the time to collision may be calculated considering a detected state of the object ahead (the acceleration or the like), the traveling state of the vehicle (the acceleration a, the deceleration d, or the like), the traveling road state (a coefficient of friction of the road surface or the like).

The control unit 30 determines whether or not the time to collision is less than a warning braking threshold value (S12). The warning braking threshold value is set in advance as a time corresponding to the time to collision which indicates that there is a possibility of collision. In a case where the time to collision is determined to be less than the warning braking threshold value, the control unit 30 determines whether or not the time to collision is less than a main braking threshold value which is shorter than the warning braking threshold value (S13). The main braking threshold value is set in advance as a time corresponding to the time to collision which indicates that the collision is imminent.

Here, in a case where the time to collision is less than the warning braking threshold value but is not less than the main braking threshold value (in a case of "Yes" in S12 and "No" in S13), the control unit 30 controls the brake unit 20 such that it performs warning braking (S14). The warning braking is performed for a driver to facilitate a steering operation or the braking operation in a case where there is a possibility of a collision but the collision is not as imminent as when the collision avoidance assist by the main braking is required. In the warning braking, the braking may be performed by a maximum output that is comparable to the set deceleration dd, or may be performed at the deceleration d which is less than the set deceleration dd.

In a case where the time to collision is not less than the warning braking threshold value (in a case of "No" in S12), the control unit 30 ends the processing of the cycle.

On the other hand, in a case where the time to collision is determined to be less than the main braking threshold value in S13, the control unit 30 performs the collision avoidance assist by the main braking as described below.

At the time of assisting the collision avoidance, the control unit 30 determines whether the set braking time tbd is set or not (S15). The set braking time tbd is initialized before the starting of the assist, and is newly set when the assist starts. In the present embodiment, the set braking time tbd is processed as a constant value from the start to the end of the assist.

Here, in a case where the set braking time tbd is not determined to be set, the control unit 30 sets the set braking time tbd based on the relative speed Vr between the vehicle and the object ahead and the set deceleration dd (S16).

The relative speed Vr can be obtained from the detection result of the object detection sensor 11, and the set deceleration dd is set as a predetermined value or a variable value. In the present embodiment, the set braking time tbd is set by dividing the relative speed Vr at the time of starting the assist by the set deceleration dd. That is because, at the time of performing the assist, that is, immediately before the collision, there is a case where the vehicle is too close to the object ahead and the relative speed Vr cannot be detected with a sufficient accuracy.

While the assist is performed, the control unit 30 performs the main braking by controlling the brake unit 20 (S17). That is, the brake unit 20 causes the main brake to operate and causes the auxiliary brake to operate if necessary so as to exert a braking at the deceleration d which is comparable to the set deceleration dd.

While the assist is performed, the control unit 30 determines whether or not a duration tb of the main braking has reached the set braking time tbd, that is, whether or not the collision avoidance assist has been performed at least over the set braking time tbd (S18).

Then, in a case where the duration tb of the main braking is determined to have reached the set braking time tbd, the control unit 30 determines whether or not the relative speed Vr has substantially decreased to zero or less (that is, whether or not the distance from the vehicle to the object ahead is widening or has begun to widen), or determines whether or not the speed of the vehicle has substantially decreased to zero (that is, whether or not the vehicle has stopped or has almost stopped) (S19). In the present embodiment, the change of the relative speed Vr can be obtained considering the deceleration d detected during duration of the main braking based on the relative speed Vr detected at the time of starting the assist.

Then, in a case where the relative speed Vr is determined to have substantially decreased to zero or less or the speed has substantially decreased to zero, the control unit 30 controls the brake unit 20 such that it stops the main braking, that is, releases the collision avoidance assist by the main braking (S20).

On the other hand, in a case where the duration tb of the main braking is not determined to have reached the set braking time tbd in S18, or in a case where the relative speed Vr is not determined to have substantially decreased to zero or less or the speed is not determined to have substantially decreased to zero in S19, the control unit 30 returns the process to S11. Then, the control unit 30 obtains the time to collision to continue the main braking or to perform the warning braking instead of the main braking, if necessary.

Figure 3:
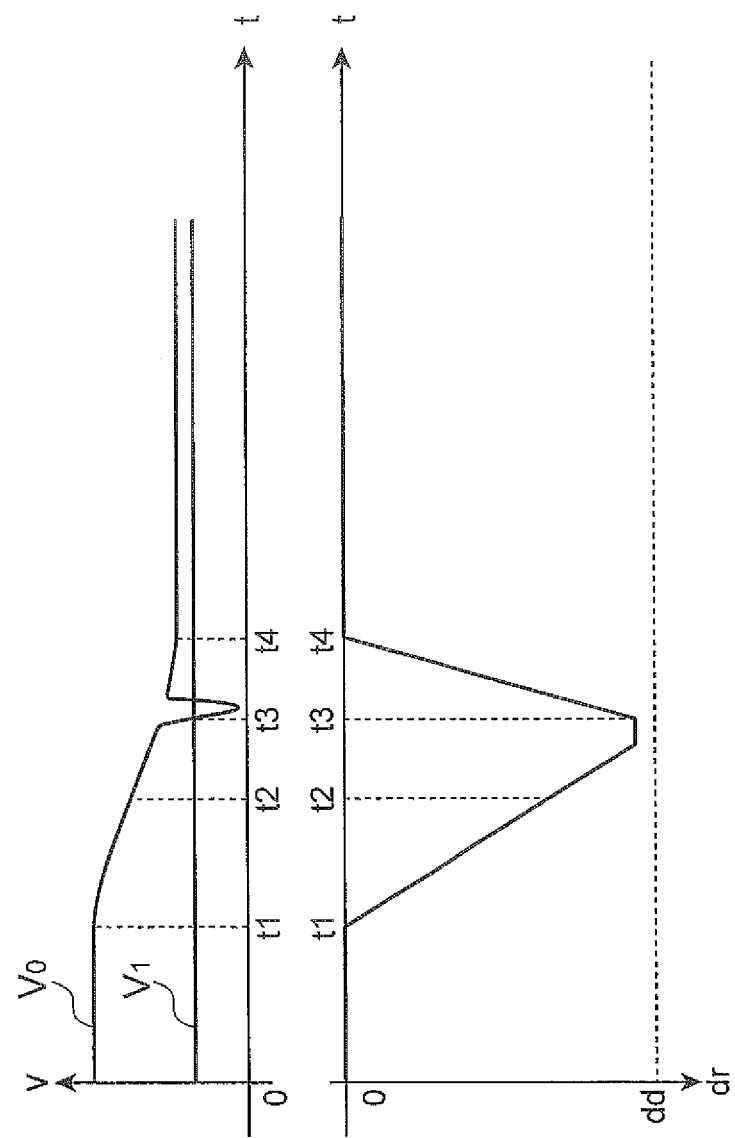
FIG. 3 is a diagram illustrating an example of a collision avoidance assist processing in the related art.
Figure 4:
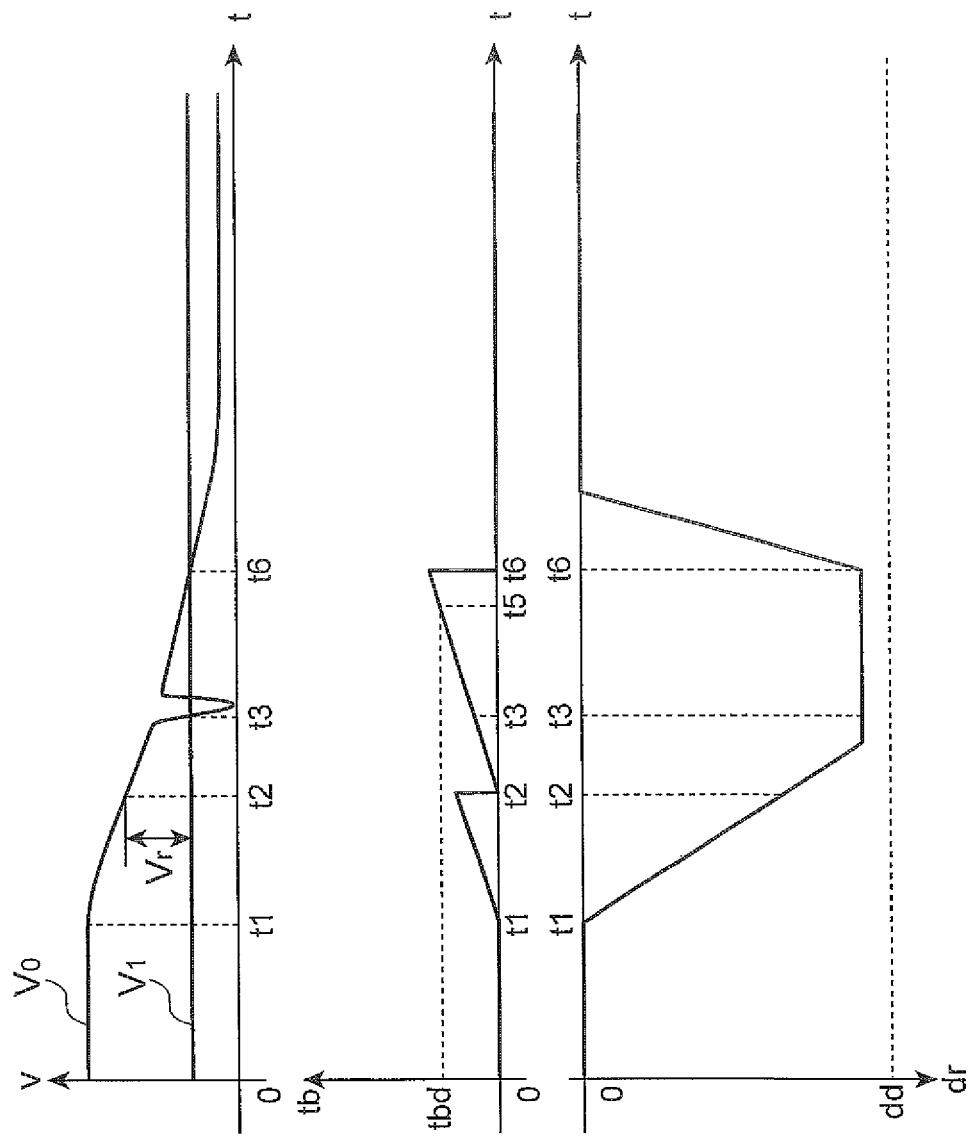
FIG. 4 is a diagram illustrating an example of a collision avoidance assist processing in the present invention.

Next, referring to FIG. 3 and FIG. 4, the collision avoidance assist processing in the present invention will be described in comparison with the collision avoidance assist processing in the related art. FIG. 3 and FIG. 4 are diagrams that illustrate an example of the collision avoidance assist processing in the related art and the collision avoidance assist processing in the present invention respectively.

In FIG. 3 and FIG. 4, time variations of the speed V0 of the vehicle, a speed V1 of the preceding vehicle, and a required deceleration dr are illustrated, and further in FIG. 4, the duration tb of the braking is illustrated. The required deceleration dr means the deceleration d required for achieving a predetermined braking.

In the collision avoidance assist processing in the related art, as will be described, below, the collision avoidance assist is released based on the relative speed Vr between the vehicle and the preceding vehicle.

As illustrated in FIG. 3, in the vehicle approaching the preceding vehicle, if the time to collision at a point in time t1 is less than the warning braking threshold value, the warning braking starts, and further, if the time to collision is less than the main braking threshold value at a point in time t2, the collision avoidance assist by the main braking is performed. While the warning braking or the main braking is performed, since the speed V0 of the vehicle is higher than the speed V1 of the preceding vehicle, the required deceleration dr gradually increases from the time of starting the warning braking, reaches the maximum value during the main braking, and then maintains that state. Here, the maximum value of the required deceleration dr is equal to or less than the set deceleration dd which the vehicle can produce.

Here, a case is assumed, where the wheels of the vehicle, for example, are locked due to a condition of the traveling road, and the speed V0 of the vehicle is detected as being equal to or less than the speed V1 of the preceding vehicle at a point in time t3. In this case, even though the speed V0 of the vehicle is actually higher than the speed V1 of the preceding vehicle, it is erroneously determined that the distance from the vehicle to the preceding vehicle starts to widen and there is no possibility of collision, and thus, the collision avoidance assist by the main braking is released. Then, the required deceleration dr gradually decreases and the decrease stops at a point in time t4. As a result, the above-described situation gives an inconvenience to the driver.

On the other hand, in the collision avoidance assist processing in the present invention, as will be described below, the collision avoidance assist is released based on the set braking time tbd set according to the relative speed Vr and the set deceleration dd.

As illustrated in FIG. 4, in the vehicle approaching the preceding vehicle, the collision avoidance assist by the main braking is performed from the point in time t2 subsequent to the collision avoidance assist by the warning braking from the point in time t1. Here, at the point in time t2 when the assist starts, the relative speed Vr (Vr=V0−V1) between the vehicle and the preceding vehicle is obtained, and based on the relative speed Vr and the set deceleration dd of the vehicle, the set braking time tbd is set. While the warning braking is performed, the braking is continued over a predetermined period (=t2−t1), at the point in time t2, together with the starting of the assist, the braking by the main braking newly starts and continues.

Then, in the processing in the present invention, while the assist is performed, it is determined whether or not the duration tb of the main braking has reached the set braking time tbd, that is, whether or not the collision avoidance assist has been continuously performed over the set braking time tbd.

Here, a case is assumed, where the speed V0 of the vehicle at the point in time t3 is detected as being less than the speed V1 of the preceding vehicle. In the processing in the related art, the collision avoidance assist by the main braking at this point in time has been released. However, in the processing in the present invention, at this point in time, it is determined that the duration tb (=t3−t2) of the main braking has still not reached the set braking time tbd. For this reason, even after the speed V0 of the vehicle is detected as being less than the speed V1 of the preceding vehicle, the main braking is continued.

When the main braking is continued, the duration tb (tb=t5−t2) of the main braking reaches the set braking time tbd at the point in time t5. Furthermore, when the relative speed Vr substantially decreases to zero or less at the point in time t6, the assist is released and the required deceleration dr gradually decreases and the deceleration is stopped. As a result, the vehicle can perform sufficient braking until the speed V0 of the vehicle falls below the speed V1 of the preceding vehicle.

As described above, according to the collision avoidance assist apparatus in the present invention, the braking is continued over the set braking time tbd that will be taken for the relative speed Vr to reach zero based on the set deceleration dd determined by the braking ability of the vehicle. Here, the set braking time tbd is set as the time that will be taken for the relative speed Vr between the vehicle and the object ahead to substantially reach zero by the braking at the set deceleration dd that the vehicle can produce, that is, the shortest time for the vehicle to avoid the collision with the object ahead. Particularly, it is preferable that the set deceleration dd be set as the shortest set braking time tbd that will be taken for the relative speed Vr to reach zero based on the maximum deceleration dd that the vehicle can produce. In this way, since the braking is continued at least over the set braking time tbd, a sufficient braking can be performed.

In addition, in a case where the braking is continued over the set braking time tbd, and the relative speed Vr substantially reaches zero or the speed V0 of the vehicle substantially reaches zero, the brake unit 20 may be controlled so as to stop the braking. In this way, until the relative speed Vr substantially reaches zero or the speed V0 of the vehicle substantially reaches zero, the braking is continued at least over the set braking time tbd. Therefore, the braking that is neither excessive nor insufficient can be performed.

In addition, the control unit 30 may set the set braking time tbd based on the relative speed Vr detected at the time of starting the braking. In this way, compared to the case where the set braking time tbd is set based on the relative speed Vr detected while the braking is performed, the relative speed Vr can be accurately detected and the set braking time tbd can be appropriately set.

In the embodiment described above, the preferred embodiment of the collision avoidance assist apparatus according to the present invention is described, but the collision avoidance assist apparatus according to the present invention is not limited to the description in the present embodiment. In the collision avoidance assist apparatus according to the present invention, modifications can be made to the collision avoidance assist apparatus in the present embodiment without departing from the scope of the present invention disclosed in the claims hereto. Furthermore, the collision avoidance assist apparatus according to the present invention may be applied to other apparatuses or systems.

In addition, the present invention, according to the method described above, can similarly be applied to a program to continue to perform the collision avoidance assist by the braking over the set braking time tbd, or to a computer readable recording medium in which the program is recorded.

For example, in the description above, a case is described, in which the set braking time tbd is set based on the relative speed Vr detected at the time of starting the collision avoidance assist, and the set braking time tbd is processed as a constant value while the assist is performed. However, in a case where the relative speed Vr can be detected with a desired accuracy while the assist is performed, the set braking time tbd may be updated based on the relative speed Vr detected while the assist is performed. In this way, the braking that is neither excessive nor insufficient can be performed.

REFERENCE SIGNS LIST 11 object detection sensor, 12 speed sensor, 13 acceleration sensor, 20 brake unit, 30 control unit, Vr relative speed, dd set deceleration, tbd set braking time

The invention claimed is:
1. A collision avoidance assist apparatus comprising:
a detection section that detects a relative speed between a vehicle and an object ahead;
a brake section that brakes the vehicle so as to avoid the collision with the object ahead; and
a control section that calculates a braking time that will be taken for the relative speed to reach zero using a deceleration of the vehicle, the deceleration being determined depending on a braking ability of the vehicle, and controls the brake section such that the braking of the vehicle is continued over the braking time.
2. The collision avoidance assist apparatus according to claim 1, wherein the control section sets a shortest braking time that will be taken for the relative speed to reach zero based on the maximum deceleration that the vehicle can produce.
3. The collision avoidance assist apparatus according to claim 1, wherein, in a case where the braking is continued over the breaking time, and the relative speed reaches zero or a speed of the vehicle reaches zero, the control section controls the brake section so as to stop the braking.
4. The collision avoidance assist apparatus according to claim 1, wherein the control section sets the braking time based on the relative speed detected at the time of starting the braking.

* * * * *